United States Patent [19]

Kimura et al.

[11] Patent Number: 4,865,676
[45] Date of Patent: Sep. 12, 1989

[54] MOLDING MEMBER AND METHOD OF PRODUCING SAME

[75] Inventor: Kaoru Kimura; Tatsuya Tamura, both of Yokohama, Japan

[73] Assignee: Hashimoto Forming Industry Co., Ltd., Yokohama, Japan

[21] Appl. No.: 126,009

[22] Filed: Nov. 27, 1987

[30] Foreign Application Priority Data

Dec. 1, 1986 [JP] Japan .................. 61-286439

[51] Int. Cl.$^4$ .............................. B29C 47/04
[52] U.S. Cl. .................. 156/244.12; 156/244.18; 156/244.25; 156/248; 156/268; 264/146; 264/149; 264/174; 264/177.1; 264/177.17; 264/177.19
[58] Field of Search ............ 264/150, 149, 174, 177.1, 264/177.16, 177.17, 177.19, 145–147, 151, 167; 156/244.11, 244.12, 244.18, 244.25, 248, 268

[56] References Cited

U.S. PATENT DOCUMENTS

| | | | |
|---|---|---|---|
| 3,136,676 | 6/1964 | Fisch .................. | 264/174 |
| 3,448,550 | 6/1969 | Herr et al. . | |
| 3,471,979 | 10/1969 | Herr . | |
| 3,608,035 | 9/1971 | Frohlich .................. | 264/146 |
| 3,825,459 | 7/1974 | Taylor .................. | 264/145 |
| 4,009,237 | 2/1977 | Kimura et al. .................. | 264/145 |
| 4,042,741 | 8/1977 | Bright .................. | 264/177.16 |
| 4,368,224 | 1/1983 | Jackson .................. | 264/177.1 |
| 4,511,526 | 4/1985 | Yamaguchi .................. | 264/177.17 |

FOREIGN PATENT DOCUMENTS

| | | |
|---|---|---|
| 0111458 | 6/1984 | European Pat. Off. . |
| 0237036 | 9/1987 | European Pat. Off. . |
| 2431644 | 3/1980 | France .................. 264/177.1 |
| 33-10373 | 7/1958 | Japan . |
| 50-17731 | 6/1975 | Japan . |
| 50-19811 | 7/1975 | Japan . |
| 53-111928 | 9/1978 | Japan . |
| 58-20415 | 2/1983 | Japan . |
| 58-23727 | 5/1983 | Japan . |
| 58-116140 | 7/1983 | Japan .................. 264/139 |
| 59-20745 | 2/1984 | Japan . |
| 59-79742 | 5/1984 | Japan . |
| 59-152810 | 8/1984 | Japan .................. 264/177.1 |
| 60-10834 | 4/1985 | Japan . |
| 60-99633 | 6/1985 | Japan .................. 264/177.1 |
| 61-40547 | 9/1986 | Japan . |
| 645288 | 9/1984 | Switzerland . |
| 102854 | 3/1917 | United Kingdom . |
| 702116 | 1/1954 | United Kingdom . |
| 1182844 | 3/1970 | United Kingdom . |

Primary Examiner—Jeffery Thurlow
Attorney, Agent, or Firm—Stevens, Davis, Miller & Mosher

[57] ABSTRACT

An elongate molding member for automobile body components and the like, as well as a method of producing such molding members are disclosed. The molding member (11) includes a core element (12), and a cover element (13) made of synthetic resin material co-extruded about the core element (11). The core element (11) has a strip-like ornamental portion (15) which is different in color from the synthetic resin material of the cover element (13) and is to be disclosed outside by removing a separable portion (18) defined by at least one longitudinal slit (17) in the cover element (13). The ornamental portion (15) of the core element (12) has a longitudinally variable width ($W_1$, $W_2$) to provide an aesthetically refined appearance and to thus satisfy various ornamental design requirements.

6 Claims, 12 Drawing Sheets

FIG_1
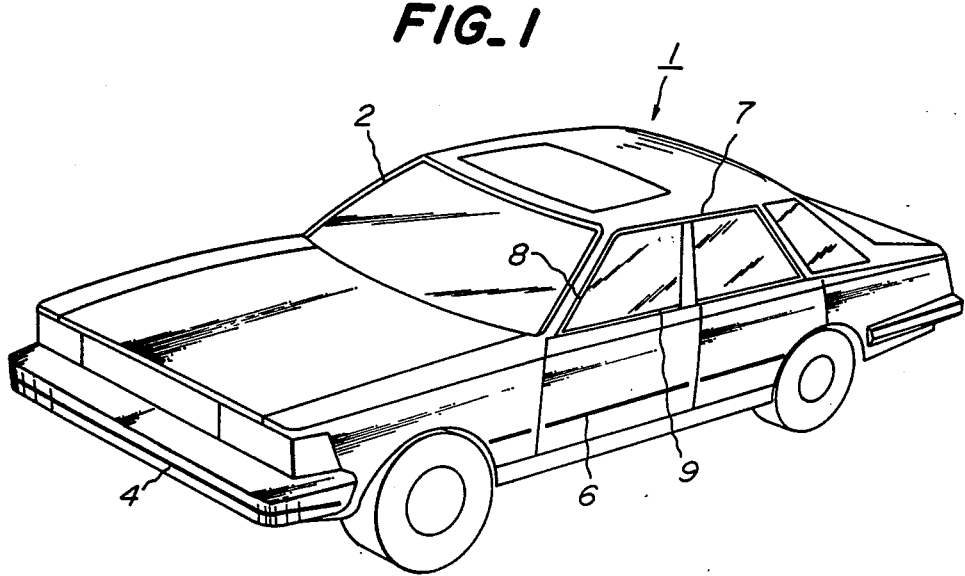
FIG_2
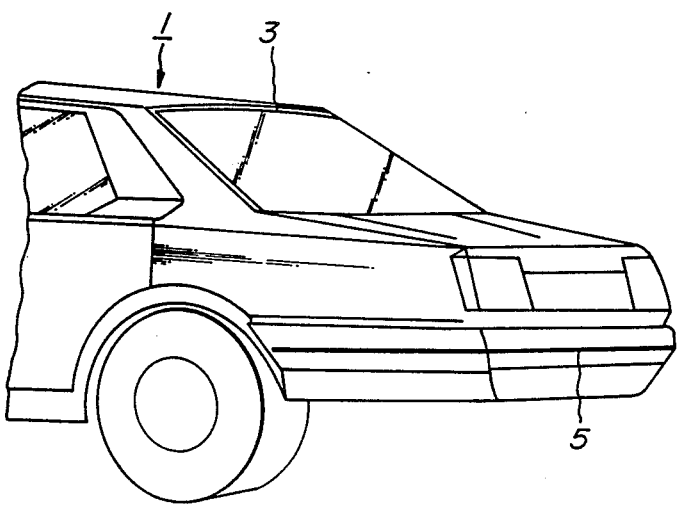

FIG_3
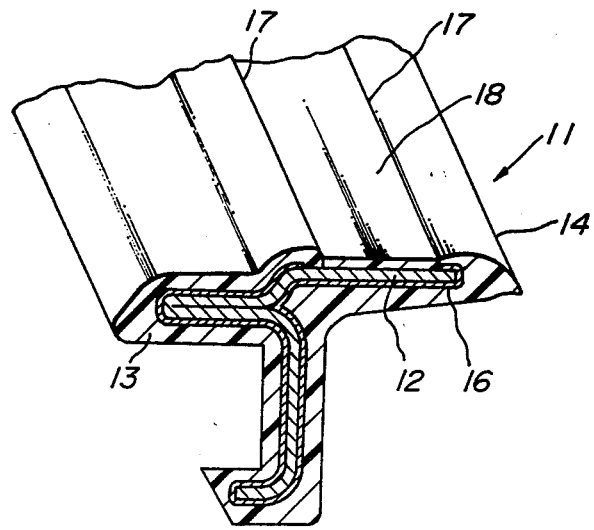
FIG_4
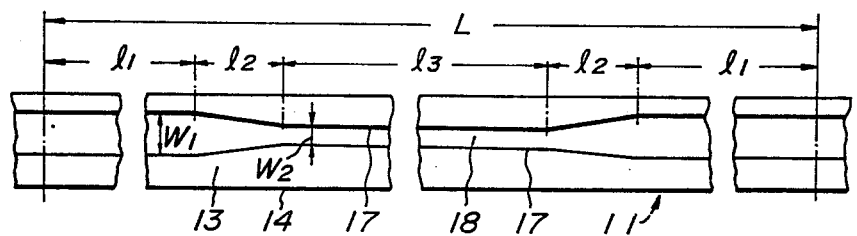
FIG_5
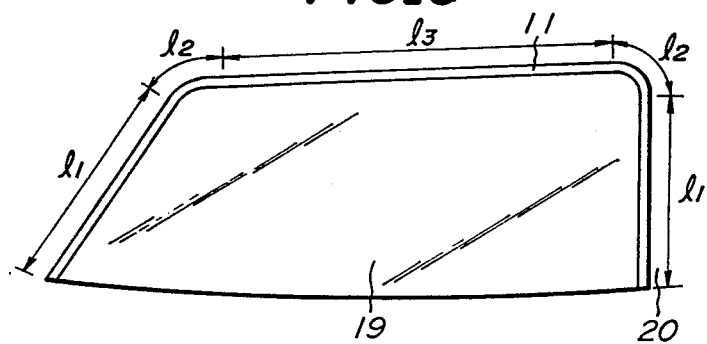

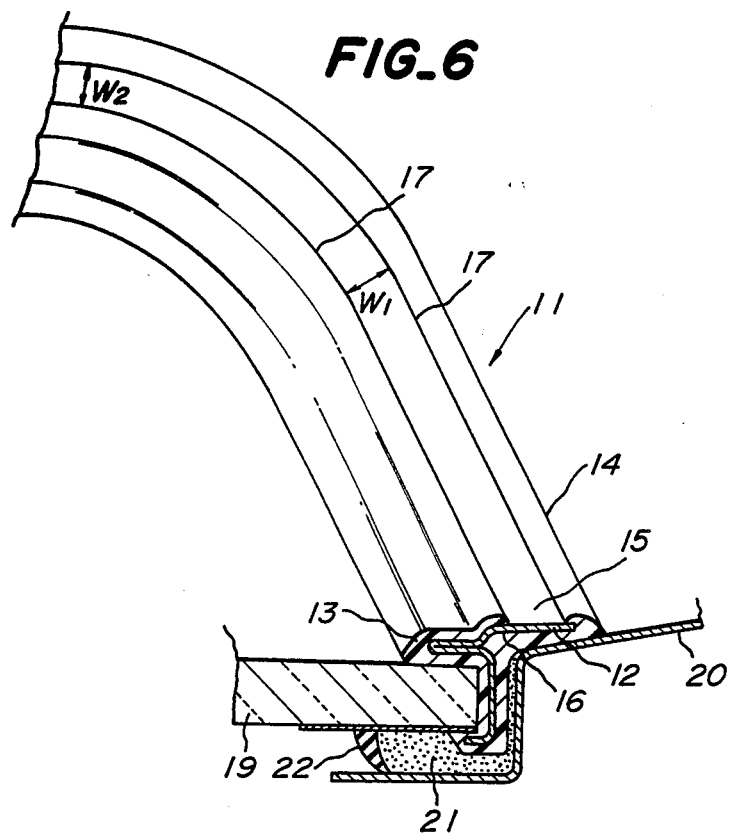
FIG_6
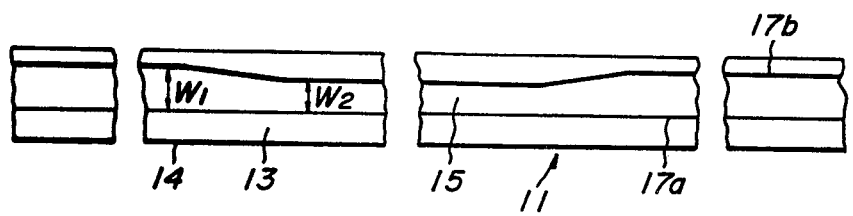
FIG_7

FIG_8
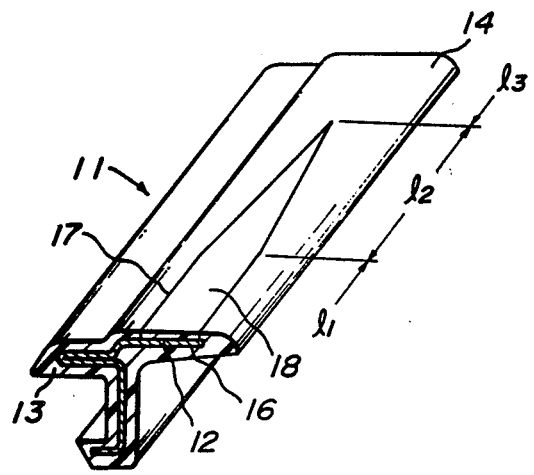
FIG_9
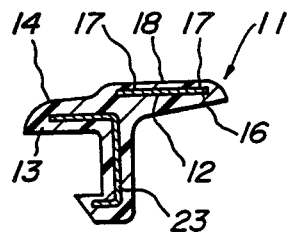

FIG_10
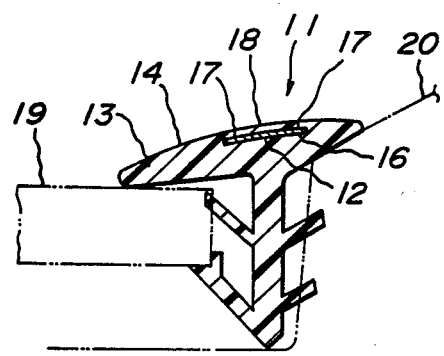
FIG_11
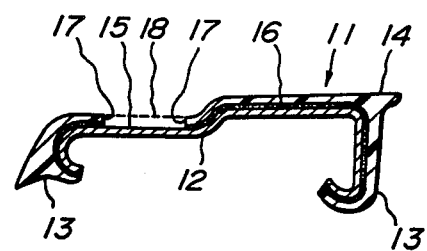

FIG_14
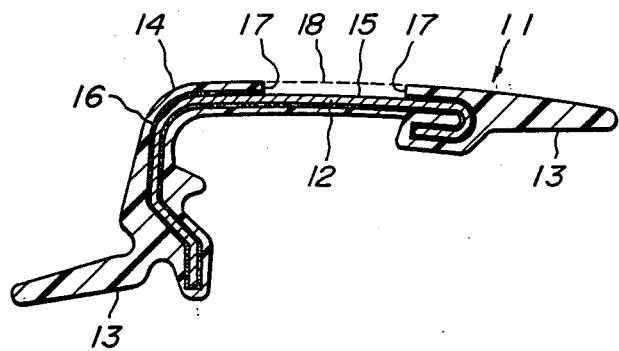
FIG_15
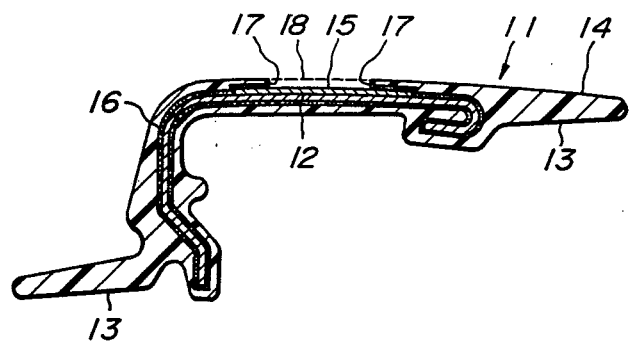

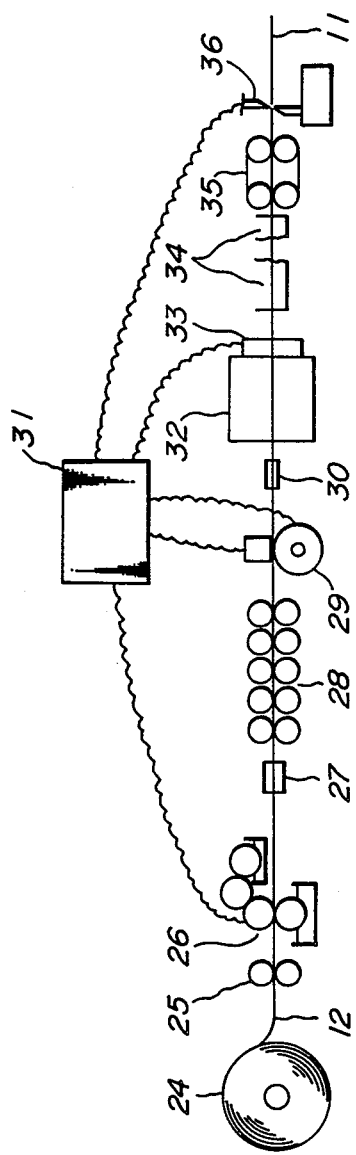

FIG_17
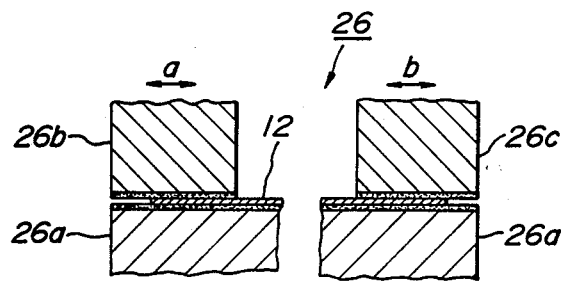
FIG_18
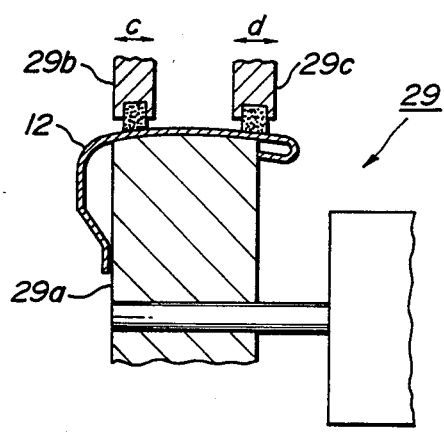

FIG_19
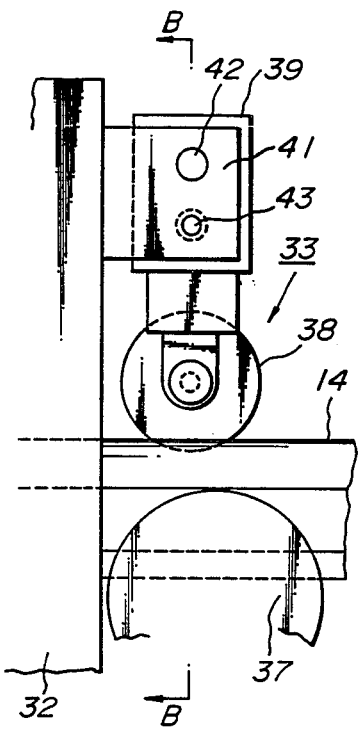
FIG_20
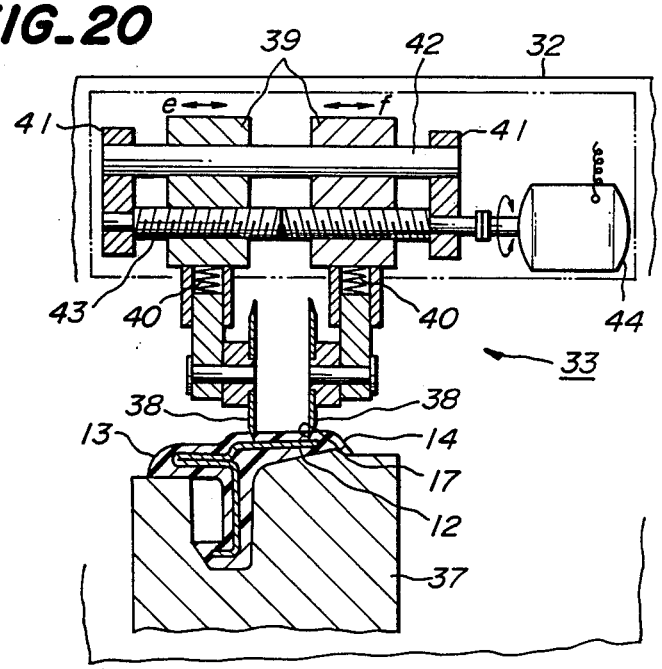

FIG_21
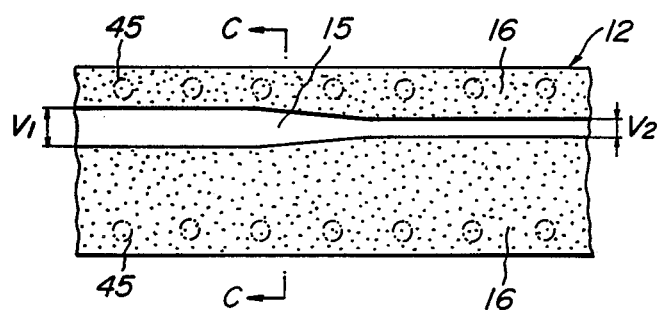
FIG_22
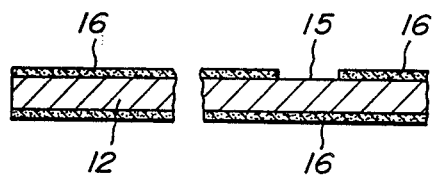
FIG_23
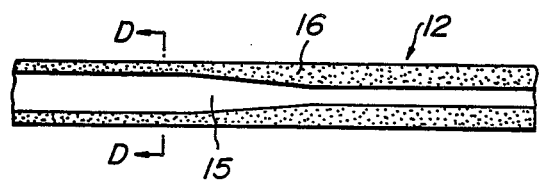

FIG_24
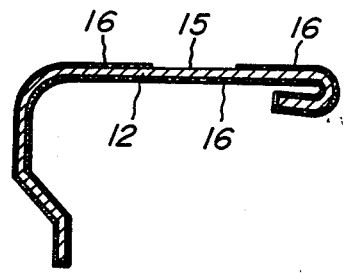
FIG_25
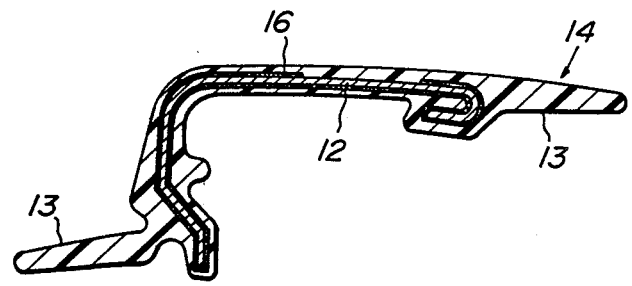
FIG_26
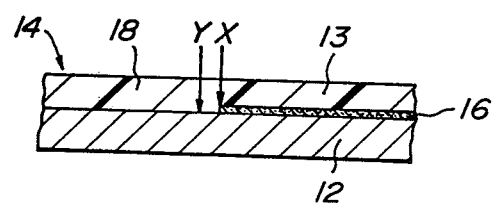

MOLDING MEMBER AND METHOD OF PRODUCING SAME

BACKGROUND OF THE INVENTION

1. Field of the Invention

The present invention relates to an elongate molding member to be used as a body component for an automobile and the like, as well as a method of producing such a molding member.

2. Description of the Related Art

Typically, various automobile body components include elongate molding members often formed of suitable synthetic resin material, such as windshield moldings, back window moldings, front and/or rear bumper moldings, drip moldings, body side moldings, pillar moldings, belt moldings, etc. For refining the ornamental appearance of the automobile, there have been various proposals and, among others, Japanese Utility Model Application Laid-open Publication No. 53-111,928 discloses a molding member with its exterior including at least one strip-like ornamental portion having a metallic luster and made different in color from the remaining portions.

More particularly, the above-mentioned proposal provides a method of producing elongate molding members wherein an elongate core element with at least one outer surface portion of a metallic luster is applied with a protective cover film along that region which corresponds to the strip-like ornamental portion of the product to be disclosed. So prepared core element is subsequently fed to an extrusion die by which synthetic resin material is co-extruded around the core element to form an elongate composite body At least one slit is then formed in the composite body at a predetermined location which corresponds to the longitudinal edge of the cover element, so as to facilitate separation of the cover film and to disclose the strip-like ornamental portion of the core element with the metallic luster.

The molding member produced as above has a uniform cross-sectional shape throughout the entire length thereof, with a constant width of the differently colored ornamental portion of the core element which is exposed outside. This means that it is not possible, by the above-mentioned known method, to produce molding members with the exposed portion of the core element having a width which varies longitudinally of the molding member to satisfy various ornamental design requirements.

In order to produce the co-extruded molding members having a differently colored ornamental portion with a longitudinally variable width, the synthetic resin material extruded around the core element may be separated and removed from the composite body with a longitudinally variable width corresponding to the ornamental portion of the core element. However, in order to facilitate the separation and removal of the synthetic resin material from the composite body to disclose the strip-like ornamental portion of the core element, the synthetic resin material would tend to be subjected to unintentional separation from the remaining portions of the core elements whereby a stable product cannot be obtained.

As an alternative approach, the molding member may be formed of a plurality of separate elements including one for the ornamental portion, which may be connected into an integral body with a so-called insertinjection process. With such a process, however, undesirable burrs may be formed along the interface of the neighbouring elements substantially deteriorating the appearance of the product.

SUMMARY OF THE INVENTION

Consequently, it is an object of the present invention to provide a molding member having a differently colored strip-like ornamental portion with its width varying longitudinally of the molding member, which satisfies various ornamental design requirements and which can manufactured in a facilitated manner without deteriorating the appearance.

According to a first aspect of the present invention, there is provided a molding member to be used as a body component for an automobile and the like, which comprises an elongate cover element made of an extrusion molded synthetic resin, a core element enclosed at least partly in said cover element, with a strip-like ornamental portion which is different in color from the cover element, an adhesive layer arranged between the extruded synthetic resin of said cover element and portion of said core element on at least one side of said strip-like ornamental portion thereof, and at least one longitudinal slit formed in said cover element to define a separable portion of the cover element, said separable portion having a predetermined width which is variable longitudinally of said molding member.

With the above-mentioned arrangement of the molding member in accordance with the present invention, the adhesive layer is present only between the synthetic resin of the cover element and portion of the core element on at least one side of the strip-like ornamental portion. In the absence of adhesive layer between the synthetic resin of the separable portion of the cover element and the strip-like ornamental portion of the core element, and since the cover element is formed with at least one longitudinal slit, the separable portion of the cover element which corresponds to the strip-like ornamental portion of the core element can be readily separated and removed to disclose the ornamental portion which is different in color from the synthetic resin of the cover element.

Because the slit defines the separable portion with a predetermined width which is variable longitudinally of the molding member, the width of the ornamental portion of the core element, which is disclosed by removing the separable portion of the cover, is also variable in accordance with a predetermined ornamental design requirement. Hence, it becomes possible to readily provide a molding member with longitudinally variable width of the differently colored ornamental portion, having an aesthetically refined appearance.

It is another object of the present invention to provide a method of producing molding members each having a differently colored strip-like ornamental portion with its width varying longitudinally of the molding member, which can be carried out in a facilitated manner without deteriorating the appearance of the product.

According to a second aspect of the present invention, there is provided a method of manufacturing molding members to be used as body components for an automobile and the like, which comprises the steps of preparing an elongate core element with a strip-like ornamental portion, applying adhesive material onto said core element to form an adhesive layer on portion of said core elements on at least side of said strip-like ornamental portion, successively supplying to an extrusion die said core element with said strip-like ornamental portion and said adhesive layer, extrusion molding a synthetic resin material about said core element to form a continuous composite body with a cover element which encloses the core element at least partly, and forming at least one longitudinal slit in said cover element to define a separable portion of the cover element, said separable portion having a predetermined width which is variable longitudinally of said molding member, and cutting the continuous composite body into a predetermined length.

With the above-mentioned steps of the method in accordance with the present invention, it becomes possible to manufacture molding members with a unique arrangement referred to hereinbefore, in a simple but reliable manner, and without deteriorating the appearance of the product.

BRIEF DESCRIPTION OF THE DRAWINGS

FIGS. 1 and 2 are perspective views of an automobile with molding members to which the present invention can be applied;

FIG. 3 is a perspective view of a portion of the windshield molding member according to one embodiment of the present invention;

FIG. 4 is a partial plan view of the molding member shown in FIG. 3;

FIG. 5 is a perspective view of the molding member of FIG. 3 in use;

FIG. 6 is a perspective view showing a portion of FIG. 5 in an enlarged scale;

FIG. 7 is a partial plan view, similar to FIG. 4, of the molding member according to another embodiment of the present invention;

FIG. 8 is a perspective view of a portion of the molding member according to another embodiment of the present invention;

FIGS. 9 to 11 are cross-sectional views showing various modifications of the molding member according to the present invention;

FIG. 14 is a cross-sectional view in an enlarged scale and taken along the line A—A in FIG. 13;

FIG. 15 is a cross-sectional view, similar to FIG. 14, of the molding member according to another embodiment of the present invention;

FIG. 16 is a schematic view showing the steps of a preferred method of producing the molding member according to the present invention;

FIG. 17 is a sectional view showing one example of the arrangement of the adhesive coating station shown in FIG. 16;

FIG. 18 is a sectional view showing one example of the arrangement of the measuring station shown in FIG. 16;

FIG. 19 is a side view showing one example of the slitter device shown in FIG. 16;

FIG. 20 is a sectional view in an enlarged scale and taken along the line B—B in FIG. 19;

FIG. 21 is a partial plan view of the metal strip according to another embodiment of the present invention;

FIG. 22 is a sectional view in an enlarged scale and taken along the line C—C in FIG. 21;

FIG. 23 is a partial plan view of the core metal plate according to another embodiment of the present invention;

FIG. 24 is a sectional view in an enlarged scale and taken along the line D—D in FIG. 23;

FIG. 25 is a cross-sectional view of the composite member which includes the core metal plate shown in FIG. 24, but which is not yet formed with the slits; and FIG. 26 is a sectional view explaining the manner of forming the slits in the cover element.

DETAILED EXPLANATION OF THE PREFERRED EMBODIMENTS

Figure 12:
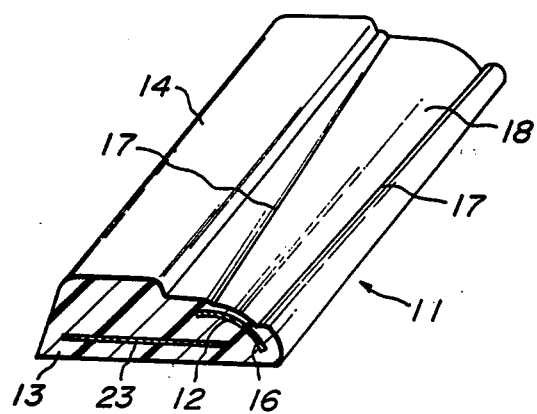
FIG. 12 is a perspective view of a portion of the molding member according to another embodiment of the present invention.

Referring now to the drawings, FIGS. 1 and 2 show an automobile denoted as a whole by reference numeral 1, with various body components comprising molding members to which the present invention is applicable. More particularly, such components include windshield moldings 2, back window moldings 3, front bumper moldings 4, rear bumper moldings 5, body side moldings 6, drip or roof moldings 7, pillar moldings 8, belt moldings 9, etc.

A molding member according to a first embodiment of the present invention is shown in FIGS. 3 to 6, as being a windshield molding member 11. The molding member 11 includes, as shown in FIG. 3, an elongate metal plate 12 forming a core element, and a cover element 13 composed of a suitable synthetic resin material extrusion molded about the metal plate 12 to form an elongate composite body 14 in which the metal plate 12 is embedded and covered by the cover element 13. The metal plate 12 may consist of stainless steel or aluminum plate with a metallic luster, and has a strip-like ornamental portion 15 that is to be exposed outside, as will be fully described hereinafter.

Furthermore, an adhesive layer 16 is arranged between the inner surface of the synthetic resin material of the cover element 13 and those surface portions of the metal plate 12 except the strip-like ornamental portion 15. Corresponding to the strip-like ornamental portion 15 of the metal plate 12, the cover element 13 is formed with a pair of longitudinal slits 17 which are spaced from each other by a predetermined, longitudinally variable distance. These slits 17 define a separable portion 18 in the cover element 13 which is directly in contact with the strip-like ornamental portion of the metal plate 12, without the adhesive layer therebetween.

As shown in FIG. 4, the molding member 11 has a total length L, and includes respective pairs of side portions $l_1$: and corner portions $l_2$, as well as an upper portion $l_3$. The distance between the slits 17 assumes substantially constant values $W_1$, $W_2$ at the side and upper portions $l_1$, $l_3$, respectively, while gradually changes from $W_1$ to $W_2$ at the corner portions $l_2$.

The above-mentioned windshield molding member 11 is used in the following manner. Firstly, the separable portion 18 of the cover element 13 formed between the pair of slits 17 is separated and removed, so as to disclose the strip-like ornamental portion 15 of the metal plate 12. Subsequently, as shown in FIGS. 5 and 6, the molding member 11 is so arranged on a predetermined location as to cover the gap formed between a windshield glass 19 and relevant body panel 20, and is fixedly secured in place by means of an adhesive material 21 filled within a closed space which is formed by the molding member 11, the windshield glass 19, the body panel 20 and a rubber dam member 22.

With the above-mentioned arrangement of the windshield molding member 11 according to the present invention, the inner surface of the synthetic resin material of the cover element 13 is firmly adhered to the entire surface of the metal plate, except the strip-like ornamental portion 15, by the adhesive layer 16. This, on the other hand, means that the adhesive layer 16 is not present between the strip-like ornamental portion 15 of the metal plate 12 and the separable portion 18 defined by the pair of slits 17 in the cover element 13. The separable portion 18 of the cover element 13 can thus be removed whenever necessary, in a very simple and reliable manner. By separating and removing the separable portion 18 of the cover element 13 along the slits 17, the strip-like ornamental portion 15 of the metal plate 12 is disclosed and becomes visible from the outside of the molding member 11. The strip-like ornamental portion 15 of the metal plate 12 so disclosed has a longitudinally variable width corresponding to the longitudinally variable distance between the slits 17, whereby the molding member 11 with an aesthetically excellent appearance, capable of satisfying various ornamental design requirements, can be obtained very easily without any deterioration in the appearance.

Several modifications of the molding member in accordance with the present invention, by way of examples, are explained with reference to FIGS. 7 to 11.

The windshield molding member 11 shown in FIG. 7 has its separable portion of the cover element 13 removed, so as to disclose the strip-like ornamental portion 15 of the metal plate 12. This molding member 11 features an arrangement in which one slit 17a extends as a straight line, while the other slit 17b extends with a desired configuration and defines the strip-like ornamental portion 15 with a longitudinally variable width.

Another windshield molding member 11 is shown in FIG. 8, wherein the pair of slits 17 are formed in the side and corner portions l₁, l₂, with the upper portion l₃ which is not formed with slits. The molding member 11 shown in FIG. 9 is similar to those as explained above and includes, beside the metal plate 12 with the strip-like ornamental portion 15, an additional core element 23 which is also covered by and enclosed in the cover element 13. On the other hand, FIGS. 10 and 11 show the molding members 11 in the form of a windshield molding with different cross-sectional shapes, while FIG. 12 shows another type of the molding member 11 which may be used as a front or rear bumper molding member, or as a body side molding member.

Figure 13:
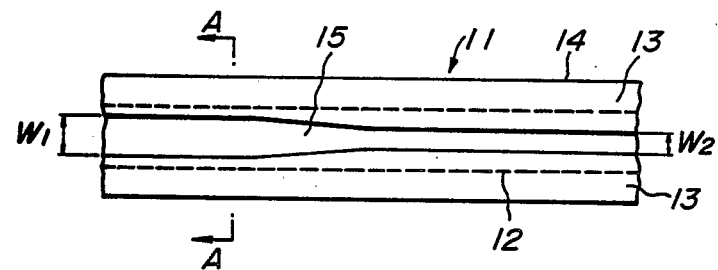
FIG. 13 is a partial plan view, similar to FIG. 4, of the molding member according to another embodiment of the present invention.

Another embodiment of the molding member according to the present invention is shown in FIGS. 13 and 14, which is for a drip or roof molding member. The drip molding member 11 has a basic structure which is essentially the same as that of the above-mentioned embodiment, and in which the distance between portions of the adhesive layer 16 on both sides of the strip-like ornamental portion 15 of the metal plate 12 is substantially the same as the distance between the slits 17 in the cover element 13, i.e. the disclosed width of the ornamental portion 15. With such an arrangement of the adhesive layer 16, the entire inner surface of the cover element 13 except for the separable portion 18 is firmly adhered to the metal plate 12, so as to effectively prevent undesirable separation of the cover element 13 from the metal plate 12 after the removal of the separable portion 18, thus maintaining the aesthetically refined appearance for a long time.

Shown in FIG. 15 is still another embodiment of the molding member according to the present invention which is also for a drip molding member. The drip molding member 11 of this embodiment comprises, besides the core metal plate 12, a separate ornamental metal strip 15 integrally secured to the core metal plate 12 to form the ornamental portion to be disclosed. The metal strip 15 has a desired color, or consists essentially of stainless steel or aluminum with a metallic luster. Furthermore, in this embodiment also, the distance between portions of the adhesive layer 16 on both sides of the disclosed region of the metal plate 15 is substantially the same as the distance between the slits 17 in the cover element 13. In other words, the adhesive layer 16 is applied to the longitudinal edges of the metal strip 15 as well, to effectively prevent undesirable separation of the cover element 13 from the metal plate 12 and the metal strip 15 after the removal of the separable portion 18, and to maintain the refined appearance for a long time.

A preferred method of producing the molding members in accordance with the present invention will be explained below, with reference to FIGS. 16 to 26. By way of example only, the molding member to be produced is illustrated as being the windshield molding member 11 shown in FIGS. 13 and 14.

As shown in FIG. 16, a continuous metal strip forming the core metal plate 12 with the ornamental portion 15 is unwound from a strip coil 24 by a pair of pinch rollers 25, and is fed to an adhesive coating station 26 where the metal strip is coated with adhesive material to form the adhesive layer 16. The adhesive coating station 26 includes, as shown in FIG. 17, a common lower roller 26a for applying the adhesive material to the lower surface of the metal strip, and a pair of upper rollers 26b, 26c for applying the adhesive material to the upper surface of the metal strip. The upper rollers 26b, 26c are movable toward and away from each other, and transversely of the metal strip, as shown by arrows a and b, so that the distance between portions of the adhesive layer 16 on both sides of the ornamental portion 15, or the width of the metal strip portion which is not applied with the adhesive material, is variable longitudinally of the metal strip.

The adhesive layer 16 is then subjected to a high temperature baking at a heating station 27 which includes an appropriate heater. Thereafter, the metal strip is fed to a roll forming station 28 including a plurality of rollers, and is shaped into a continuous metal body with a desired cross-section which corresponds to that of the core element 12 in the product. The metal body is supplied to a measuring station 29 including a rotary encoder, for example, for measuring the supplied length of the metal body, and then to another heating station 30 including an appropriate heater for heating the adhesive layer 16 to activate the adhesive material.

More particularly, as shown in FIG. 18, the rotary encoder of the measuring station 29 includes a lower roller 29a whose rotation is converted into an output signal representing the supplied length of the metal body, which signal is supplied to a controller or a CPU 31. The rotary encoder further includes a pair of upper rollers 29b, 29c which, like the upper rollers 26b, 26c of the adhesive coating station 26, are movable toward and away from each other and transversely of the metal strip, as shown by arrows c and d, so as to further apply adhesive material to the metal strip thereby to recover possible separation of the adhesive layer 16 during the passage of the metal strip through the roll forming station 28. The output signal of the rotary encoder at the measuring station 29, which is supplied to the controller 31, is used to control the distance between the rollers 26a, 29a and 26b, 29b and to adjust the width of the region on the metal strip and the metal body to which the adhesive material is not applied, in accordance with the supplied length of the metal body.

Subsequently, the continuous body with the desired cross-section is supplied to an extrusion die 32 by means of which a suitable synthetic resin material is heated and co-extruded, in its molten state, about the continuous body to form the elongate composite body 14 with the cover element 13 enclosing the core element 12. A slitter device 33, also controlled by the controller 31, is arranged on the exit side of the extrusion die 32 to form a pair of slits 17 in the cover element 13 while the slits varies longitudinally of the composite body 14. The composite body 14 is then supplied to and cooled in cooling tanks 34 and drawn by take-up belt device 35, and is thereafter cut, at a controlled point, into a predetermined length by a cutter device 36 which is controlled by the controller 31, whereby the desired molding members are formed successively.

FIGS. 19 and 20 show one preferred example of the slitter device 33 which includes a supporting roller 37 for the composite body 14, and a pair of rotatable cutter blades 38. The cutter blades 38 are supported by respective carriages 39 so as to be also movable toward and away from each other transversely of the composite body 14, as shown by arrows e and f in FIG. 20. The carriages 39 are guided by a guide rod 42 secured to bearing plates 41, and are in mesh with a threaded rod 43 rotatably journaled by the bearing plates 41, which threaded rod consists preferably of a ball bearing screw rod with axially aligned left-handed and right-handed threaded portions. The cutter blades 38 are urged by compression springs 40 against the surface of the composite body 14, and may be moved transversely of the composite body 14 by a reversible servomotor 44 which is connected to one end of the threaded rod 43 and controlled by the controller 31.

In operation, the distance between the cutter blades 38 is set to be $W_1$ initially, and is controlled in response to the supplied length of the core element 12 in the following manner. As mentioned above, the measuring station 29 includes the rotary encoder which supplies the controller 31 with an output signal representing the supplied length of the core element 12. As the supplied length of the core element 12 reaches a predetermined value, the controller 31 supplies a command signal to the servomotor 44 whereby the servomotor 44 is actuated to drive the threaded rod 43 in a normal direction. The carriages 39 are thus moved toward each other, and the distance between the cutter blades 38 gradually decreases to $W_2$. When a further predetermined length of the core element 12 is detected, the servomotor 44 is stopped whereby the decreased distance $W_2$ between the cutter blades 38 is maintained. Upon detection of a next predetermined length of the core element 12, the servomotor 44 is actuated to drive the threaded rod 43 in a reverse direction so that the carriages 39 are moved away from each other, and the distance between the cutter blades 38 increases to a desired value. In this manner, the distance between the cutter blades 38 and hence, the distance between the slits 17 is adjusted in response to the supplied length of the core element 12, providing a longitudinally variable width of the disclosed ornamental portion 15 of the metal plate 12.

When the molding member 11 produced as above is used with its separable portion 18 removed, despite an essentially the same cross-sectional shape of the extrusion molded composite body 14 throughout the entire length, the molding member 11 is visually characterized by a longitudinally variable width of the ornamental portion 15. More particularly, the molding member 11 appears as a whole, as if it has a longitudinally variable cross-section and has thus been made by a process other than the extrusion process. By this, a variety of ornamental design requirements can be satisfied in a very facilitated manner. Moreover, the entire inner surface of the synthetic resin material forming the cover element 13, except for the separable portion 18, is tightly adhered to the core metal plate 12 by the adhesive layer 16 with its portions on both sides of the ornamental portion 15 spaced from each other by a longitudinally variable distance. Thus, the cover element 13 can be retained in adhesion with the metal plate 12 even after the removal of the separable portion 18, without being subjected to undesirable separation, so that an aesthetically refined appearance can be preserved for a long time.

In the above-mentioned embodiment of the method of producing molding members, in accordance with the present invention, the entire surface of the core metal plate 12 except for the ornamental portion 15 is applied with the adhesive material to form the adhesive layer 16 with which the synthetic resin material of the cover element 13 is brought into tight adhesion with the core metal plate 12. Alternatively, the adhesive material may be applied only to particular regions of the metal plate 12 which are adjacent to the ornamental portion 15, specifically when the metal plate 12 is formed with a number of through-holes 45, as shown in FIGS. 21 and 22, through which the synthetic resin material on both surfaces of the metal plate 12 is united with each other to provide an improved retention of the cover element 13 with respect to the core metal plate 12.

Similarly, in the above-mentioned embodiment of the method of producing molding members, in accordance with the present invention, all the upper rollers 26b, 26c, 29b and 29c at the adhesive coating station 26 and the measuring station 29 are arranged so as to be movable in directions shown by arrows a to d, respectively, in order to obtain the longitudinally variable distance between the portions of the adhesive layer 16 on both sides of the ornamental portion 15 of the metal plate 12. However, either one pair of the rollers of the adhesive coating station 26 or the measuring station 29 may be arranged as being spaced from each other with a constant distance or, alternatively, one of the rollers of each pair may be arranged as an axially movable roller relative to the other roller of the pair which, in turn, is arranged at an axially fixed location.

To produce the molding member 11 shown in FIG. 7, a pair of slits 17 may be formed with only one of the cutter blades 38 being moved in response to the supplied length of the core element 12, and relative to the other of the cutter blades 38 which is arranged at an axially fixed location. However, it is also possible to form one of the slits 17 by the extrusion die 32, with the provision of only one cutter blade 38 to form the other of the slits 17. On the other hand, the molding member 11 shown in FIG. 8 can be produced by moving the cutter blades 38 toward each other and away from the composite member 14, before the cutter blades 38 reach the upper portion l₃. The molding member 11 shown in FIG. 9 can be produced by simultaneously supplying the extrusion die 32 with the metal plate 12 having the ornamental portion 15, as well as the additional core element 23. The molding member 11 shown in FIGS. 10 to 12 can be produced substantially in the same manner. Furthermore, the molding member 11 shown in FIG. 15 can be produced by integrally securing a separate ornamental metal strip 15 to the core metal plate 12 with adhesive material, and subsequently applying another adhesive material to the surface of the integrated metal plate 12 and the ornamental metal strip 15 to form the adhesive layer 16.

The ornamental portion 15 to be exposed outside may be composed of an appropriate material which is capable of providing a desired appearance, such as stainless steel foil, aluminum foil, metallic vacuum deposition layer or synthetic resin film with a metallic luster, and may form either integral or separate part of the core metal plate. Furthermore, when the adhesive layer is formed on the core metal plate substantially leaving the ornamental portion free from the adhesive material, the transversal edges of the adhesive layer need not accurately coincide with the slits. In other words, as shown in FIG. 26, the slits 17 may be formed either along the edges X of the adhesive layer 176 or along a predetermined lines Y which is somewhat spaced inwardly from the adhesive layer 16. The slits 17, on the other hand, may be formed by non-rotating cuter blades instead of rotatable cutter blades 38 as shown.

When the molding member 11 is of a straight configuration, the separable portion 18 may be removed immediately after it has been made by forming the slits 17. However, in case of a molding member for which the composite body 14 has to be subjected to machining for forming perforations, or to bending for obtaining a curved configuration, for example, it is advantageous to separate and remove the separable portion 18 shortly before the molding member is actually used, in order to protect the ornamental portion 15 of the core metal plate 12.

Finally, in the above-mentioned embodiments of the present invention, a pair of slits 17 are formed in the cover element 13 to define the separable portion 18. Such an arrangement of the slits 17, however, is not a prerequisite condition to carry out the invention. In particular, the molding member of the present invention may include a single layer of synthetic resin material as the cover element, a core element which is partly exposed outside already when the composite member has been formed, and an adhesive layer between the inner surface of the cover element, except for the separable portion thereof, and the opposite surface of the core element. With such an arrangement, the cover element may be formed with a single slit to define the separable portion with a longitudinally variable width, adjacent to one longitudinal edge of the cover member, which is arranged on outer side when the molding member is used. The other longitudinal edge of the cover element is arranged on inner side of the molding member in use, and extends substantially in parallel with the longitudinal axis of the molding member.

From the foregoing description, it will be appreciated that the present invention provides a molding member having a differently colored strip-like ornamental portion with a longitudinally variable width to satisfy various ornamental design requirements, as well as a method of producing such molding members which can be carried out in a very facilitated and economical manner without deteriorating the appearance of the product. The present invention is applicable to efficiently and economically produce various molding members for automobiles and also for other purposes, and various modifications can be made within the purview of those skilled in the art.

What is claimed is:

1. A method of producing a molding member to be used as a body component for an automobile and the like, comprising the steps of:
   (a) preparing an elongate core element with a strip-like ornamental portion;
   (b) applying adhesive material onto said core element to form an adhesive layer on a portion of said core element located on at least one side of said strip-like ornamental portion such that said adhesive layer is not formed on said strip-like ornamental portion;
   (d) extrusion molding a synthetic resin material about said core element to form a continuous composite body with a cover element which encloses the core element at least partly;
   (e) forming at least one longitudinal slit in said cover element to define a separable portion of the core element, said separable portion being disposed above said strip-like ornamental portion and having a predetermined width which is variable longitudinally of said molding member; and
   (f) cutting the continuous composite body into a predetermined length.

2. The method as claimed in claim 1 wherein a pair of longitudinal slits are formed in said cover element to define said separable portion of the cover element.

3. The method as claimed in claim 1 or 2, wherein said slit is formed by a cutter blade arranged on the exit side of said extrusion die.

4. The method as claimed in claim 1, wherein the width of said separable portion defined by said slit is controlled in accordance with the length of said core element supplied to said extrusion die.

5. The method as claimed in claim 1, wherein said adhesive material is applied to said core element such that said adhesive layer on at least one side of said strip-like ornamental portion of said core element has a longitudinally variable width which corresponds to said predetermined width of said separable portion.

6. The method as claimed in claim 5, wherein the width with which said adhesive material is applied to said core element is controlled in accordance with the length of said core element supplied to said extrusion die.

* * * * *